United States Patent [19]
Leung

[11] Patent Number: 6,128,265
[45] Date of Patent: Oct. 3, 2000

[54] PORTABLE DISC PLAYER

[75] Inventor: Wilson Wai Sing Leung, Hong Kong, The Hong Kong Special Administrative Region of the People's Republic of China

[73] Assignee: Alco Electronics Limited, Quarry Bay, The Hong Kong Special Administrative Region of the People's Republic of China

[21] Appl. No.: 09/114,070

[22] Filed: Jul. 13, 1998

[51] Int. Cl.[7] .................................................. G11B 33/02
[52] U.S. Cl. ............................................................ 369/75.1
[58] Field of Search .................................. 369/75.1–75.2, 369/77.1–77.2, 178, 191–192; 360/93, 96.6, 96.5

[56] References Cited

U.S. PATENT DOCUMENTS

| | | | |
|---|---|---|---|
| 5,265,083 | 11/1993 | Ishii et al. ............................... | 369/77.1 |
| 5,414,573 | 5/1995 | Koga et al. ................................ | 360/93 |
| 5,583,834 | 12/1996 | Kanada et al. .......................... | 369/77.2 |
| 5,764,433 | 6/1998 | Hanzawa et al. ....................... | 360/105 |
| 5,808,996 | 9/1998 | Aoyama .................................. | 369/77.1 |
| 5,963,528 | 10/1999 | Fujimura et al. ....................... | 369/77.1 |

*Primary Examiner*—Allen T. Cao
*Attorney, Agent, or Firm*—Leydig, Voit & Mayer, Ltd.

[57] ABSTRACT

A portable music and/or video disc player which has a body housing a playing mechanism. The playing mechanism includes a spinning capstan for supporting and rotating a disc and a laser head for reading the disc. The body has a lid pivotably connected to a side of the body for movement between a closed position lying flat against the body and an open position revealing the capstan. The lid has a transparent area and flanges with ribs defining a volume for holding a sheet-like insert, such as a leaflet including lyrics which comes with a disc. The insert is viewable through the transparent area.

7 Claims, 2 Drawing Sheets

PORTABLE DISC PLAYER

The present invention relates to a portable music and/or video disc player, such as a CD (compact disc) player.

BACKGROUND OF THE INVENTION

A conventional portable CD player has a body which is generally flat and provided with a top lid covering almost the entire top side of the player body. Because of the limitation of size, the lid is invariably used to support control buttons and/or a liquid crystal display. There is no place on the player to hold a leaflet including lyrics which comes with a particular CD or any CD advertising material.

The subject invention seeks to provide a portable music and/or video disc player which can hold such additional material.

SUMMARY OF THE INVENTION

According to the invention, there is provided a portable music and/or video disc player comprising a body housing a playing mechanism including a spinning capstan for supporting and rotating a disc and a laser head for reading the disc, wherein the body is provided with a top lid pivotably connected to a side portion of the body for movement between a closed position lying flat against the body and an open position revealing the capstan, the lid having a transparent area and a part provided at a small distance behind to define a flat space for holding a sheet-like insert which is viewable through the transparent area.

Preferably, the disc player includes a plurality of buttons for controlling the playing mechanism, at least one of which control buttons is provided atop the side portion of the body.

More preferably, the lid is arranged to lie side-by-side with the side portion of the body when the lid is in the closed position.

Further more preferably, the side portion of the body is raised.

It is preferred that the disc player include a liquid crystal display on the side portion of the body.

In a preferred embodiment, the lid has a pair of flanges on opposite sides, which are provided with respective ribs acting as two said parts to define the flat space for holding a sheet-like insert.

More preferably, the flanges and ribs extend along opposite sides of the lid.

In another preferred embodiment, the lid has a double-walled structure, with the inner wall acting as the part, to define the flat space for holding a sheet-like insert.

In a specific construction, the flat space has an open end on the side of the body opposite to the side portion for receiving a sheet-like insert, and the body has an upstanding lip on that side for closing the open end of the flat space when the lid is in the closed position.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
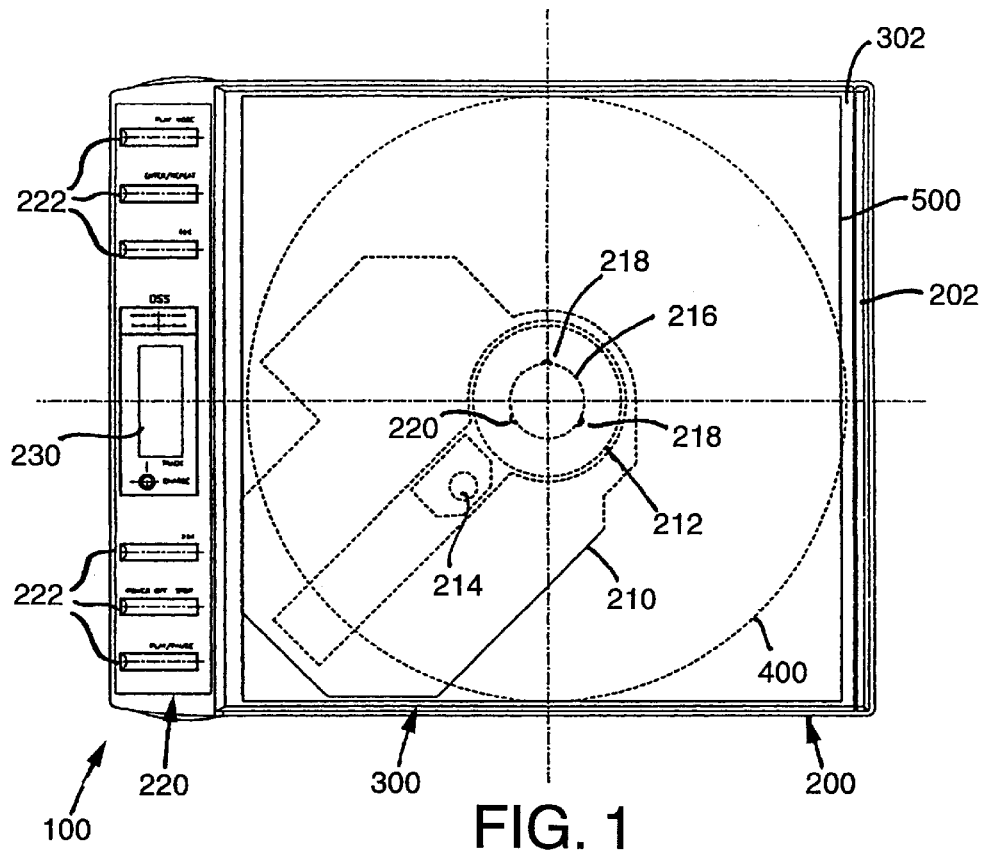
FIG. 1 is a top plan view of an embodiment of a portable music and/or video disc player in accordance with the invention.
Figure 2:
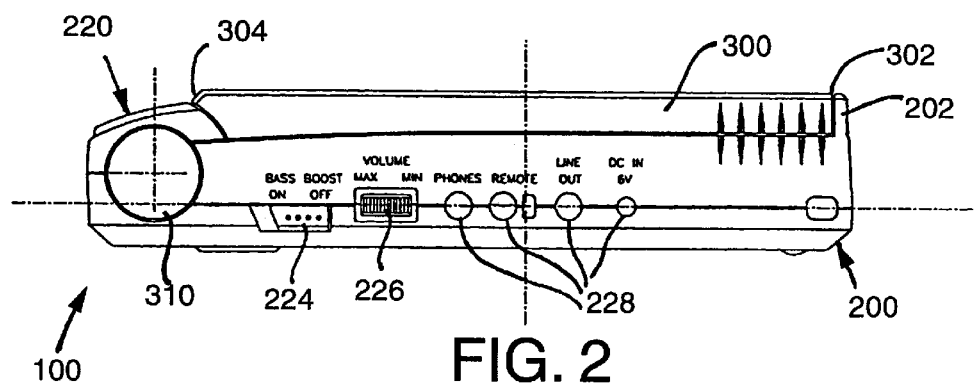
FIG. 2 is a left side view of the player of FIG. 1.
Figure 3:
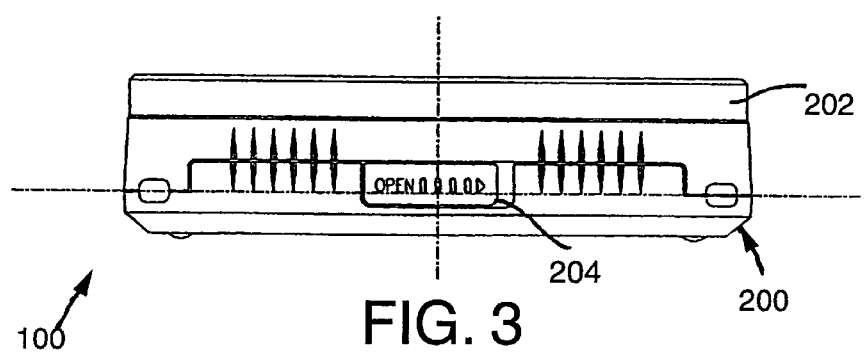
FIG. 3 is a front end view of the player of FIG. 1.
Figure 5:
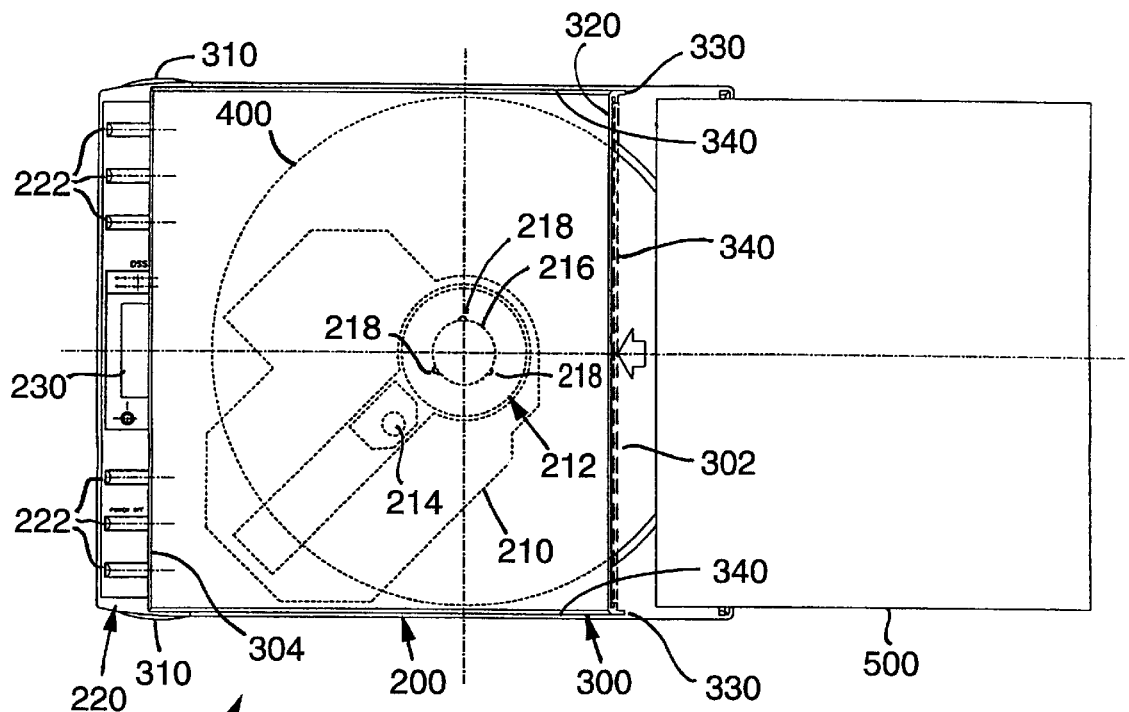
FIG. 5 is a top plan view of the player of FIG. 4.
Figure 4:
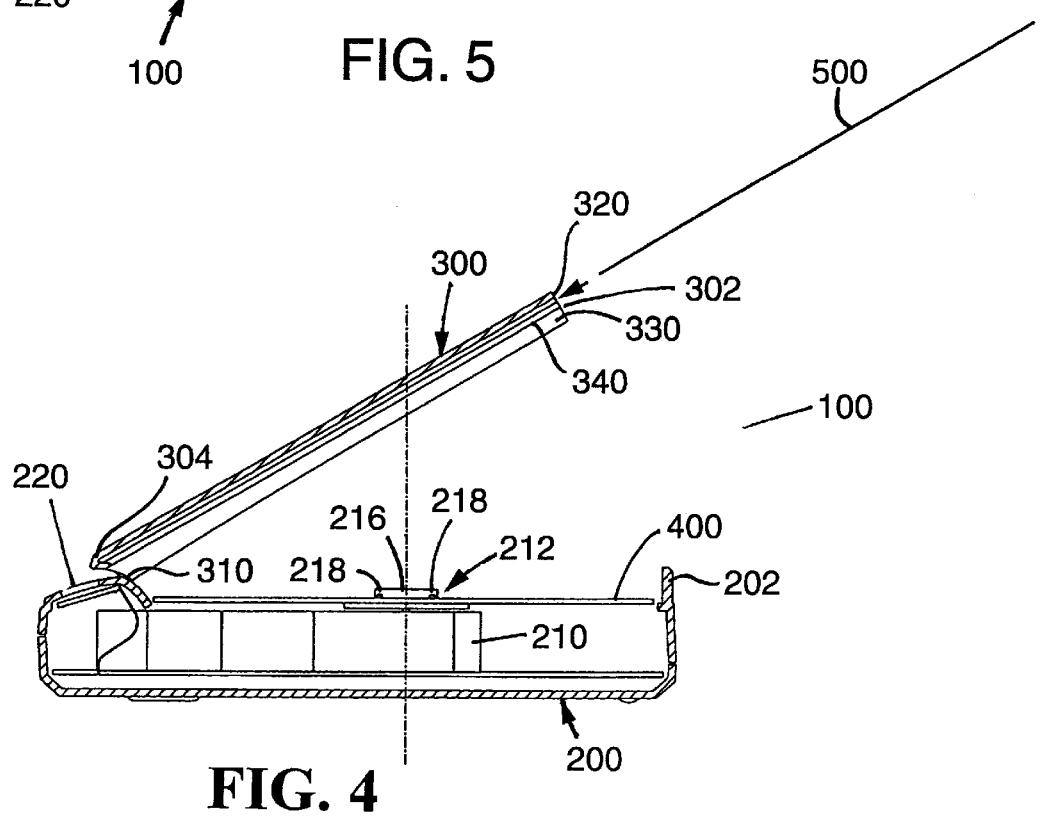
FIG. 4 is a cross-sectional left side view of the player of FIG. 1, showing a lid which is opened for holding a sheet-like insert.

Referring to the drawings, there is shown a compact disc or CD player 100 embodying the invention, which player 100 has a generally flat rectangular body 200 and a rectangular top lid 300. The player body 200 houses a CD playing mechanism 210 which includes, as seen from above, a central spinning capstan 212 for supporting and rotating a CD 400 and a laser head 214 moving along a radial path for reading the CD 400. The capstan 212 has a co-axial flat boss 216 for engaging through the centre hole of the CD 400. The boss 216 is provided with three equi-angularly spaced spring-loaded ball catches 218 for self-holding the CD 400 in place by the rim of the CD centre hole.

The player body 200 has a rear side and a narrow raised portion acting as a control panel 220, extending along the entire rear side. The lid 300, which is moulded from a transparent plastic material, is pivotably connected to the rear side of the player body 200 by means of two integral hinge parts 310 on opposite left and right sides of the lid 300. The lid 300 is closable downwards to lie flat against the player body 200 and side-by-side with the control panel 220 and openable upwards to reveal the capstan 212 (and the laser head 214) for CD loading or unloading. In the closed position, the lid 300 covers the entire top side of the player body 200 except the control panel 220.

The playing mechanism 210 is controlled by means of six press buttons 222, including play/pause, advance, rewind and power off/stop buttons, provided on the control panel 220. Further controls, namely a bass boost slide switch 224 and a volume turning knob 226, are provided on the left side of the player body 200. A number of sockets 228, for earphone, remote control, line out and DC power, are also provided on the left side of the player body 200. A liquid crystal display 230 is provided centrally on the control panel 220.

The lid 300 has a main panel 320 and a pair of integral flanges 330 extending along and depending from left and right sides of the panel 320, thereby forming an inverted flat U-shaped cross-section. Each side flange 330 has a co-extending integral rib 340 at a small distance behind the main panel 320. The panel 320, flanges 330 and ribs 340 define a flat rectangular space for holding a sheet-like paper insert 500, such as a leaflet including lyrics which comes with this particular CD 400 or any CD advertising material.

The lid 300 has an open front end 302 through which the insert 500 may be placed into or withdrawn from the lid 300, and a closed rear end 304 for retaining the insert 500. The front side of the player body 200 includes with an upstanding lip 202 for closing the front end 302 when the lid 300 is closed and locked by means of a latch 204.

The insert 500 is conveniently held within the lid 300 and viewable through the panel 320 to, for example, identify the particular CD 400 being played or the related singer. For viewing purposes, it is appreciated that only the central part of the panel 320 needs to be transparent to provide a see-through area. If the insert 500 contains lyrics, it may easily be removed and unfolded for reading. Of course, the insert 500 may be of any other nature, such as a picture or photograph for mere display or of a certain design for decoration only.

In a slightly different embodiment, the ribs 340 of the lid 300 may extend across and join together to form a back panel 340' lying co-planar with the existing panel 320, thereby forming a double-walled structure for containing the insert 500. Such a back panel 340' will keep the insert 500 away from the CD 400 being played underneath it. Also, the back panel 340' will permit the known use of a CD clamp for holding the CD 400 against a spinning capstan not equipped with any spring-loaded ball catches.

The subject invention may be applied to a portable player for playing any other types of music and/or video discs, such as a mini disc (MD) or a video compact disc (VCD).

The invention has been given by way of example only, and various other modifications of and/or alterations to the described embodiment may be made by persons skilled in the art without departing from the scope of the invention as specified in the appended claims.

What is claimed is:

1. A portable disc player comprising:

a body having a side;

a playing mechanism within the body and including a spinning capstan for supporting and rotating a disc and a laser head for reading the disc; and a lid pivotably connected to the side of the body for movement between a closed position lying flat against the body and an open position revealing the capstan, the lid having a transparent area, a pair of flanges extending along opposite sides of the transparent area and depending from the lid, each flange having a corresponding rib spaced from the transparent area, the ribs defining a volume having an open front end for receiving and holding a sheet-like insert viewable through the transparent area.

2. The disc player as claimed in claim 1, including a plurality of buttons for controlling the playing mechanism, at least one of the control buttons is located on the side of the body.

3. The disc player as claimed in claim 2, wherein the lid lies side-by-side with the side of the body when the lid is in the closed position.

4. The disc player as claimed in claim 3, wherein the side of the body is raised.

5. The disc player as claimed in claim 1, including a liquid crystal display on the side of the body.

6. The disc player as claimed in claim 1, wherein the lid has a double-walled structure, including inner wall defining the volume for holding a sheet-like insert.

7. The disc player as claimed in claim 1, wherein the open front end of the volume is opposite to the side, and the body has an upstanding lip on the side for closing the open end of the volume when the lid is in the closed position.

* * * * *